United States Patent [19]

Hagin et al.

[11] Patent Number: 4,762,191

[45] Date of Patent: Aug. 9, 1988

[54] ARTICULATED VEHICLE SELECTIVELY DRIVEN AT TWO AXLES FROM TWO POWER SOURCES

[75] Inventors: Faust Hagin; Hans J. Drewitz, both of Munich, Fed. Rep. of Germany

[73] Assignee: MAN Nutzfahrzeuge GmbH, Fed. Rep. of Germany

[21] Appl. No.: 870,715

[22] Filed: Jun. 4, 1986

[30] Foreign Application Priority Data

Jun. 20, 1985 [DE] Fed. Rep. of Germany ....... 3522062

[51] Int. Cl.⁴ ..................... B60L 7/00; B60K 25/00
[52] U.S. Cl. ........................... 180/14.2; 180/14.4; 180/14.7; 180/65.2; 180/69.6; 280/403
[58] Field of Search ............... 180/65.2, 65.1, 69.6, 180/14.2, 14.1, 14.3, 14.4, 14.7, 165, 243, 24.06; 280/403

[56] References Cited

U.S. PATENT DOCUMENTS

| 1,817,820 | 8/1931 | Higley | 180/65.2 |
|---|---|---|---|
| 2,132,450 | 4/1932 | Wolf | 180/69.6 |
| 2,244,216 | 6/1941 | Pieper | 180/69.6 |
| 2,407,007 | 9/1946 | Henrichsen | 180/69.6 |
| 3,994,353 | 11/1976 | Greene | 180/14.3 |
| 4,180,138 | 12/1979 | Shea | 180/65.2 |
| 4,469,187 | 9/1984 | Hagin et al. | 180/65.2 |
| 4,502,558 | 3/1985 | Mauri | 180/65.2 |
| 4,511,012 | 4/1985 | Rauneker | 180/65.2 |

FOREIGN PATENT DOCUMENTS

| 693234 | 7/1940 | Fed. Rep. of Germany. |
|---|---|---|
| 723666 | 8/1942 | Fed. Rep. of Germany. |
| 882557 | 7/1953 | Fed. Rep. of Germany. |
| 2501386 | 7/1976 | Fed. Rep. of Germany. |
| 2510623 | 9/1976 | Fed. Rep. of Germany. |
| 2802635 | 7/1979 | Fed. Rep. of Germany. |
| 3140492 | 6/1982 | Fed. Rep. of Germany. |
| 3246182 | 6/1984 | Fed. Rep. of Germany. |

OTHER PUBLICATIONS

DE-Firmenschrift: Daimler Benz: DUO-Omnibusse 0305/0305G.
DE-Z: Verkehr und Technik, 1983, Duale Antriebe im Öffentlichen Personenverkehr, H.5,S.163-168.
DE-Z: Verkehr und Technik, 1982, 80 Jahre Obus-Anstriebstechnik von AEG-Telefunken, H.10,S.363-374.
DE-Z: Verkehr und Technik, 1981, Gedanken zur Entwicklung eines Fahrzeuges für das Duo-Bus-System, H.1,S.31-33.

Primary Examiner—David M. Mitchell
Attorney, Agent, or Firm—Roberts, Spiecens & Cohen

[57] ABSTRACT

A vehicle, more especially in the form of an articulated omnibus, has a hybrid drive system comprising an IC engine and an electric motor, whose power is transmitted not only to an axle driven by the IC engine but in addition to a further drive axle in order to extend the working life of the transmission axles.

10 Claims, 2 Drawing Sheets

ARTICULATED VEHICLE SELECTIVELY DRIVEN AT TWO AXLES FROM TWO POWER SOURCES

BACKGROUND OF THE INVENTION

1. Field of the Invention

The invention relates to a hybrid vehicle and more particularly to a hybrid city omnibus comprising an IC drive engine and an electric drive motor whose power is of the same order of magnitude as that of the IC engine and preferably is generally equal thereto, and a transmission for selectively and alternatively connecting the motor and the engine with a vehicle drive axle.

2. Description of Prior Art

Such a vehicle as previously proposed for example in the German unexamined specification No. 2,153,961, comprises a summating transmission connected with the IC engine and the electric motor while a third shaft of the transmission is connected with the drive axle of the hybrid vehicle. When operating with the engine, the output shaft of the motor will be decoupled and vice versa so that then either the motor or the engine solely drives the hybrid vehicle.

Such a hybrid vehicle has a series of advantages: if such a hybrid drive is used in a city omnibus for example, which is to travel both in lightly populated areas in the city outskirts and also in heavily populated areas, such an omnibus may be electrically driven in the latter using the motor to avoid pollution of the air, whereas in the outskirts the diesel engine will be used as the prime mover.

In this case the diesel engine may be used in addition in order to charge up batteries for the motor. A particular advantage of such a hybrid vehicle is to be seen in the fact that the motor may also be used as a generator for braking the vehicle and thereby charging the batteries, supplying current to the electrical supply system or operating an electric brake and thus contributing to recovering a part of the braking power.

It is especially in the case of a city omnibus that frequent stopping is necessary when it arrives at stops or when negotiating city traffic jams. The considerable amount of braking power then produced is partly recovered, while at the same time the friction brakes of the omnibus will be less worn. It will also be seen that such a hybrid vehicle is particularly appropriate in hilly cities, as for example on starting from rest when the motor may aid the engine; in the case of a city omnibus, its diesel engine may operate with a comparatively light load, so that on starting, less smokey exhaust gas is evolved than would otherwise be the case with a diesel engine.

Such a hybrid vehicle is, however, substantially more elaborate in its construction than a conventional vehicle, which is only driven by an IC engine, such more complex structure being not only due to the motor, its batteries and a device for switching over the drive, but also for two further reasons: it has been seen in the past that the axle drives of such hybrid vehicles have a much higher wear rate than is the case with conventional vehicles, even if the power supplied to the driving axle was not greater than that in the case of a conventional IC engine. Investigations have led to the discovery of the reason for this: the electric motor has to have a power which is of the same order of size as that of the IC engine in order to produce the required degree of maneuverability of the vehicle when running with its electric drive. This circumstance makes it imperative to provide a motor whose armature is comparatively heavy and has a comparatively large diameter. If one furthermore takes into account the fact that the motor is run at a comparatively high speed of rotation, it will become apparent that the moment of rotational inertia of the motor is substantially greater than that of an IC engine with the same driving power. The driving chain (i.e. means connecting the prime mover with the wheels) of a vehicle forms a resilient system whose loading will increase with the moment of rotational inertia of that prime mover. Accordingly, the driving chain of the vehicle will be very much more heavily loaded if there is an electric motor at one end than if the drive is an IC engine. A further factor is that during braking very much greater braking powers sometimes have to be transmitted by the driving chain to the electric motor running as a generator.

Commercial vehicles with such a hybrid drive are necessarily higher in price, without producing a higher driving power, than regular commercial vehicles operated solely with an IC engine; the only consolation is that the fuel consumption is somewhat lower due to the utilization of the braking power. Accordingly, it is not possible to make any savings in design which would reduce the working life of the vehicle, since such a vehicle would then be worthless. It is for this reason that the designer is forced to make the axle drive of such a vehicle and the driving chain from the drive axle to the electric motor so sturdy that it has a sufficient service life. However, such a design necessarily leads to bulky transmissions so that in the case of commercial vehicles a part of the payload space has to be devoted to parts of the drive. In the specific case of a city omnibus with a rear engine and a drive rear axle this will mean that the floor of the vehicle will have to be at a higher level over the rear axle so that access to the seats at the very back of the vehicle will be impaired. This part of the vehicle floor will not be able to be used by standing passengers either.

SUMMARY OF THE PRESENT INVENTION

Accordingly one object of the invention is to remedy at least one of the above-mentioned shortcomings of the prior art to a greater or lesser extent.

A further object of the invention is to so improve a hybrid vehicle of the initially mentioned type that its working life is prolonged.

A still further object of the invention, is to make such an improvement, utilizing conventional means as employed in vehicle construction.

A still further objective of the invention is to accomplish such object without decreasing the internal capacity in the vehicle.

In order to to achieve these or other objects appearing during the course of the ensuing specification, a further axle of the vehicle is adapted for use as a drive axle and there is a further transmission able to be connected therewith and with the electric motor. This second drive axle may have driving means (differential, driving gearing or the like) identical with that of the first, already present drive axle so that components that are already available may be employed. Thus there is a departure from previous practice in which the electric motor was connected with a single axle, and it is connected with two, of which however each axle is only dimensioned like such a drive axle which was previously used with an IC engine. Accordingly the IC engine of the hybrid vehicle may only take effect through one single axle of the two drive axles in order to reduce loads on the other axle and to avoid additional losses.

The second or additional drive axle is, like the conventional axle, so constructed that at the most it only takes up very little of the payload space in the hybrid vehicle. Accordingly, very simple means are used to substantially increase the length of life of the hybrid vehicle without it being necessary to design and manufacture transmissions in new, larger sizes.

There are a large number of different possible forms of the invention and to take an example, the electric motor, or more accurately the electric drive, may be split up into two electric motors each with half the required power, each such motor being joined to one of the drive axles. The extension of the life of the vehicle due to this form of the invention is however comparatively slight, seeing that the moment of rotational inertia of an electric motor of a given power is substantially greater than half that of an electric motor with twice the power.

A more practical construction is one in which the transmission of the drive power between the electric motor and at least one of the axles is hydraulic, but in this case there is the disadvantage of the elaborate design and poorer efficiency.

In accordance with one form of the invention, it is therefore particularly advantageous if the two drive axles are connected by a universal joint shaft, if one ignores the special case of a twin axle, in which two similar axles are placed close together and are connected by a short shaft. In the case of a twin axle arrangement, a differential gear between the two drive axles is not absolutely essential, but will be needed if the two drive axles are somewhat far apart. However, in vehicle construction four-wheel drive vehicles are provided with axle drives which have a connection for a universal joint shaft for driving a further axle and a differential so that in this case as well conventional, pre-existing or conventional components may be used.

As a basic proposition it is possible to combine the electric motor and the IC engine in a single drive block. In accordance with one form of the invention it is however more especially advantageous if the electric motor is arranged on the second drive axle. Sudden loading effects due to the high moment of inertia of the electric motor are in this case damped by the intermediate universal joint shaft or a similar power transmission means when power is transmitted to that drive axle which is associated with the IC engine, so that the drive axle associated with the IC engine is subjected to less stresses during operation of the hybrid vehicle with the electric motor than the second drive axle which is placed nearer to the electric motor. As a result there is an improved distribution of the load between the two drive axles, since during operation with the IC engine the drive axle associated with it will be the only axle which is loaded (if the charging operation is left out of consideration).

It is furthermore possible to accommodate the electric motor, which has a comparatively small overall size, directly adjacent to the drive axle in such a way that it does not take up the payload space in the vehicle.

For putting the IC engine and the electric motor into and out of operation it is possible, as noted in the said German specification No. 2,153,961, to connect the two drives with a summating transmission and to keep its input, which is not being used free by the use of a clutch. However, in accordance with the invention it is possible to provide each of the transmissions of the two drive axles, which each have a prime mover, with a clutch which disconnects the respective drive prime mover from the change speed transmission. One result of this is that the reactive power, which occurs in a differential when one of its inputs is locked, is avoided. This feature as well ultimately makes a contribution to prolonging the life of a transmission that is designed for relatively light loads.

Additionally, however, the design in accordance with the invention involves the advantage that the mode of operation may even be switched over during travel: if there is to be a change from one prime mover to the other, the prime mover which is so far uncoupled is run up to such a speed that the two halves of the clutch are synchronous. Then the one prime mover is connected while at the same time the other prime mover is disconnected so that a jerk-free changeover in the mode of operation is possible. Such a changeover may, for example, be necessary if the electric motor is designed for a lower power than the diesel engine and if there is a steep uphill slope in the route of an omnibus running electrically: in such a case the driver will start the diesel engine when a certain load limit of the omnibus has been exceeded at the foot of a slope and then at the top of the slope it will then be readily possible to change back to electric operation and for the diesel engine to be stopped.

It is clear that it is possible to keep the power connection between the two drive axles (which may well be a universal joint shaft), in operation at all times so that the hybrid vehicle in accordance with the invention will have a multi-axle driving system, something which under some conditions will lead to better maneuverability. In keeping with a preferred form of the invention it is however advantageous if this drive connection, i.e. only the universal joint shaft, is only used during electric operation, while during IC engine operation the shaft will be put out of operation by an already present or specially provided clutch. In this case during operation with the IC engine the drive axle next to the electric motor will be free of any load so that the wear of the two drive axles will be made equal. Furthermore, during IC engine operation efficiency will be even higher.

In accordance with a further feature of the invention the hybrid vehicle of the invention may be designed as an articulated pusher omnibus which has a drive unit at the rear of the rear segment in the form of the IC engine, the speed changing transmission and the axle of the rear axle of the rear segment. Between the back segment and the front carriage there are hydraulically operated supports which prevent collapse onto the ground.

In accordance with the invention the second drive axle is in the form of the rear axle of the front carriage or, in the case of an articulated vehicle with more than two articulating members or segments, of the axle or rear axle of the peultimate segment. This last-mentioned axle is connected with the drive axle for the rear segment via a universal joint shaft.

Articulated omnibuses are still being produced with a universal joint shaft as a connection between the IC engine at the rear end of the last segment and the transmission on the one hand and the rear axle of the front carriage on the other hand. Such universal joint shafts, the arrangement for the passage of the shaft through the articulation between the two parts of the vehicle, and the rear axle of the front carriage connected with this universal joint are therefore still being produced since such parts are still stocked as spares. In the case of the articulated omnibus of the invention it is therefore possible to have recourse to available parts so that complexity of design and of operation of the articulated omnibus of the invention may be substantially reduced. It is only necessary to provide a clutch with connection for the electric motor on the drive axle of the front carriage. Since the overall height of the electric motor, if placed horizontally, is small and not in excess of the drive axles, the motor may be placed in front of the axle and under the hybrid vehicle floor as well. Furthermore the universal joint shaft is placed under the floor. And the battery spaces are under the vehicle floor. Accordingly the hybrid articulated omnibus has the same size of passenger compartment as a conventional articulated omnibus without an additional electric drive.

The hybrid articulated omnibus of the invention does not therefore have the disadvantage as compared with a conventional articulated omnibus of a shorter working life or very much higher costs of production and a smaller passenger compartment. And in fact the increased costs of the hybrid articulated omnibus of the invention are only moderately higher than those of a conventional articulated omnibus, such increased costs being outweighed by advantages of less pollution of the air in densely populated areas. The recovery of power when the vehicle brakes to a certain degree means that the reduction in fuel consumption will cause less damage to the environment; the saving in fuel will in most cases equal the additional maintenance costs.

As already mentioned more than once, a particular advantage of the vehicle of the invention is the possible provision of a means for recovering braking energy. This means has a controller which is connected with a brake actuating device such that when the driver brakes, a drive connection is produced between the two drive axles and the electric motor, if such a connection has been been previously in existence, and causes the electric motor to be switched for braking operation as a generator. When the brake actuating device is switched off, the respective switching operations are reversed so that the condition before braking is returned to. If the electric motor and the IC engine each have a clutch on the respective axle transmission, this clutch will be put out of or into operation, the two clutch parts having been caused to run synchronously beforehand if desired.

If for instance the brake actuating device is operated while the vehicle is powered by the IC engine, the IC engine will be disconnected by the clutch and the stationary electric motor slowly connected, the clutch then acting as a torque converter and serving to run the electric motor up from zero rpm to suitable speed while the vehicle is slowing down. It is however also possible to run the electric motor up to speed before operating the clutch until the speed of the two clutch halves is equal and then engage the clutch. In this case the braking action is caused by taking a very high power from the electric motor using suitable circuitry measures. If, after braking, the vehicle is to be switched over to IC engine operation again, the first step will be to disconnect the electric motor, and the IC engine is run up to a suitable speed by opening the throttle and when the two halves of the IC engine clutch are running synchronously the clutch will be engaged.

The brake actuating device may be provided in addition to the normal brake pedal, as for example in a manner similar to the engine brake of omnibuses and trucks, or it may be constituted by the brake pedal or it may be connected therewith for operation and take the form, for instance, of a pressure sensing feeler responding to the pressing in the circuit of the brake system.

The invention will now be described in more detail with reference to the accompanying diagrammatic drawings and by way of example only.

DETAILED DESCRIPTION OF WORKING EXAMPLES OF THE INVENTION

Figure 1:
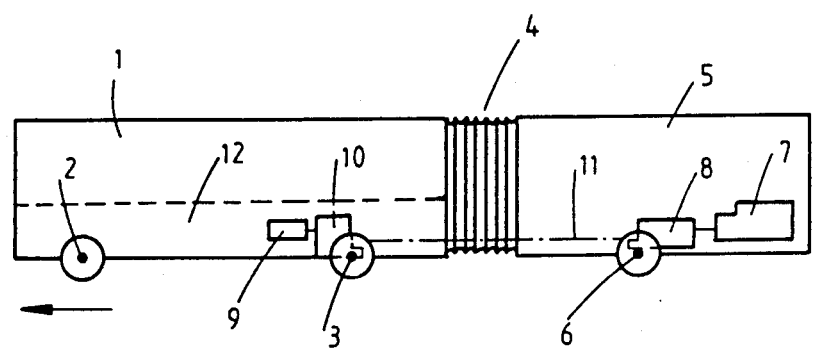
FIG. 1 is a view of a hybrid articulated omnibus in accordance with the present invention as seen from the side.

FIG. 1 is a diagrammatic side view of a hybrid omnibus embodying the present invention. This omnibus has a front carriage 1 or segment with a steered front axle 2 and a non-steered rear axle 3. By way of an articulation represented symbolically by the bellows 4, the front carriage 1 is connected with a rear segment 5, which for its part has an axle 6. The direction of travel of this articulated omnibus is indicated by an arrow.

In the rear part of the back segment 5 there is an IC engine 7 which has a non-automatic or automatic speed changing transmission. The output of this transmission is connected with an axle transmission 8, which is connected with the axle 6 of the rear segment 5, which accordingly forms the drive axle of the omnibus.

In front of its rear axle 3 the front carriage 1 has an electric motor 9, which is connected with an axle transmission 10 that is connected with the rear axle, therefore acting as a drive axle 3, of the front carriage 1.

The two axle transmissions 8 and 10 are connected together by a universal joint shaft 11 as indicated in broken lines.

The floor 12 of the passenger space in the front carriage 1 is marked in broken lines. As indicated, the axle transmission 10 and the electric motor 9 and furthermore the universal joint shaft 11 are placed under the floor 12 of the passenger space in the front carriage 1.

Figure 2:
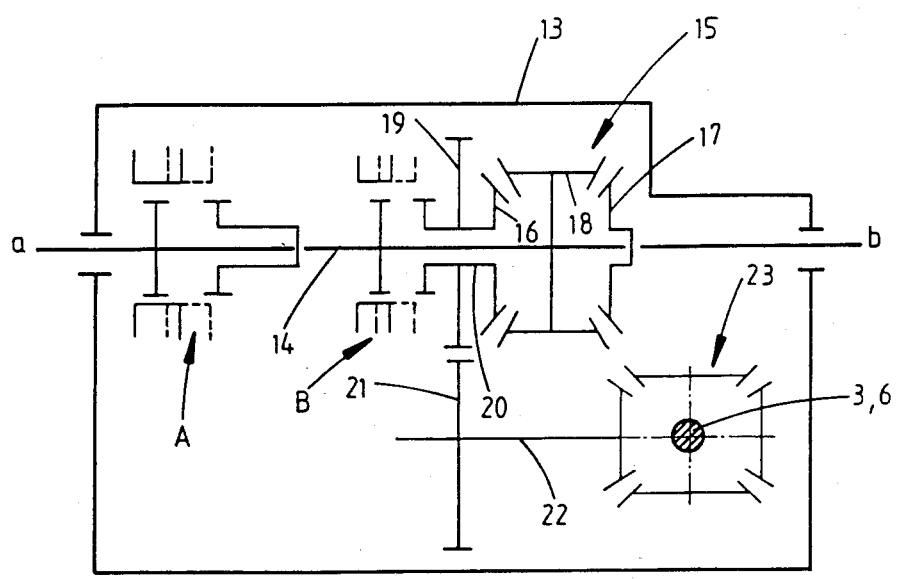
FIG. 2 is diagrammatic view of the transmission for use in the omnibus of FIG. 1.

FIG. 2 diagrammatically shows an axle transmission. This axle transmission has a transmission housing 13, whose wall has the following shafts extending through it: an input shaft a, an input or output shaft axle b, and two half axles which form the front and rear drive axles 3 and 6, respectively, of the articulated omnibus of FIG. 1.

As shown, the shaft a has one end rotatably supported on the wall of the transmission housing 13, whereas its inner end is rotatably supported at the end of a shaft 14, which is placed coaxially to the shaft a.

The shafts a and 14 are connected by a clutch A which in the disengaged condition, as shown in full lines, allows relative rotation between the shafts a and 14, whereas in the engaged condition, as marked in broken lines, the clutch A connects the two shafts a and 14 with each other.

The shaft 14, whose one end supports the end of the shaft a, extends into a differential 15 through its first input gear wheel 16 and it is rotatably supported in its second input gear wheel 17. The two bevel gears 18 of the differential 15 are arranged to rotate with the shaft.

Coaxially to the shaft 14 the input bevel gear wheel 17 of the differential 15 carries the shaft b, which extends upwards through the transmission of the housing 13 and is rotatably supported therein.

The other input bevel gear wheel 16 of the differential 15 is mounted on a hollow shaft 20, which surrounds the shaft 14 and carries an intermediate gear wheel 19. Furthermore on the end of the hollow shaft 20, remote from the input bevel gear wheel 16 of the differential, one half of a clutch B is mounted whose other half is mounted on the shaft 14. In the disengaged condition, as shown in full lines, the hollow shaft 20 and the shaft 14 may be freely turned in relation to each other; in the engaged condition of the clutch B, which is indicated in broken lines, the hollow shaft 20 and the shaft 14 are connected for the transmission of rotary motion therebetween.

The intermediate gear wheel 19 is a spur wheel and meshes with a second spur wheel 21 keyed on a shaft 22 extending parallel to the shaft assembly a, 14 and b, and forming the input shaft of a differential 23, whose two outputs are formed by the half axles 3 and 6. During cornering, the differential 23 drives the vehicle wheels at different speeds which are connected with the half axles 3 and 6.

Figure 3:
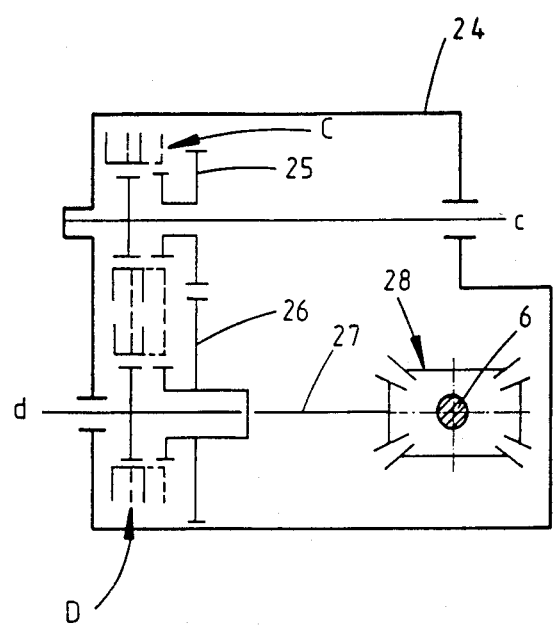
FIG. 3 is diagrammatic view of a further transmission for use in an omnibus according to FIG. 1.

FIG. 3 shows a further transmission which has a housing 24, through which four shafts extend, that is to say an input drive shaft c, an output drive shaft d and the two half shafts of the rear axle 6.

The input shaft c, is rotatably supported at both its ends in the housing 24 of the transmission. One of its ends protrudes from the housing.

At its other end there is a clutch C which is connected with an intermediate spur gear wheel 25 surrounding the shaft c.

In the disengaged condition of the clutch C, as shown in full lines, relative motion of the shaft c and of the spur gear wheel 25 is possible, while in the engaged condition, as shown in broken lines, the clutch C produces a power transmitting connection between the shaft c and the spur gear wheel 25.

The spur gear wheel 25 meshes with a further and preferably larger intermediate spur gear wheel 27, which is mounted on a shaft 26, which is connected with the input of a differential 28, whose two outputs are formed by the half axles of the rear segment rear axle 6. The purpose of the differential 28 is to drive the wheels connected with the half axles 6 at different speeds on cornering.

The shaft d has one end rotatably supported in the end of the shaft 27 remote from the differential 28, while the other end of the shaft d extends through the housing 24 and is rotatably supported therein. In its disengaged state as shown in full lines clutch D allows free relative rotation between the shaft 27 and the shaft d, whereas in the engaged condition as shown in broken lines, the clutch D connects the shafts d and 27 together for transmission of power therebetween.

The following describes of two possible embodiments of the invention.

First Embodiment:

In this case the two axle transmissions 8 and 10 of the hybrid articulated omnibus of FIG. 1 are each constituted by a transmission in accordance with FIG. 2.

These transmissions are so constructed that their two shafts b are connected together by the universal joint of shaft 11, whereas the electric motor 9 and the IC engine 7 are connected with its associated non-automatic transmission via the shaft a.

As already noted hereinbefore, the transmission of FIG. 2 has intermediate gearing in the form of the spur gear wheels 19 and 21.

The differential 15 functions to allow the axles 3 and 6 of the omnibus of FIG. 1 to run at different speeds.

When traveling between urban centers using the IC engine 7, while the electric motor 9 is shut down, the clutch A of the front axle transmission 10 is disengaged. The shaft a of the transmission 10 is connected with the IC engine 7. The clutch B is then engaged. In the rear axle transmission 8 on the other hand the clutch A is engaged, which connects the shaft a (which is connected with the IC engine 7) with the shaft 14. The clutch B on the other hand is engaged.

When operating in densely populated areas using the electric motor 9 only, the clutch A of the front axle transmission 10 is engaged, whereas the clutch B is disengaged. On the other hand the clutch A of the rear axle transmission 8 is disengaged, while the clutch B is engaged.

In the manner of operation of the omnibus as described with only the IC engine 7 operating, the electric motor 9 is completely disconnected. However if the driver intends to use it to provide current, the clutch A of the front axle transmission 10 is engaged.

Second Embodiment:

In this form of the invention the front drive axle 3 has its transmission 10 of the type shown in FIG. 2, whereas the axle transmission 8 of the drive axle 6 of the rear vehicle segment is formed by the transmission of FIG. 3.

When operating in less densely populated areas solely on the IC engine 7, the electric motor 9 will normally be stationary.

In this condition the clutch C of the transmission of FIG. 3, which forms the axle transmission 10 is disengaged, the clutch A is disengaged and the clutch B may be engaged or disengaged.

During operation in densely populated areas using only the electric motor 9 and with the IC engine 7 shut down, in the axle transmission 8 for the rear axle 6 (see FIG. 3) the clutch C is engaged, whereas the clutch D is disengaged. The IC engine 7 connected with the shaft d is therefore disconnected from the axle transmission in the construction of FIG. 3. On the other hand the differential 28 of the transmission of FIG. 3 is connected via the intermediate gearing 25 and 27 with the shaft c, which is connected with the front axle transmission 10 via the universal joint shaft 11.

The front axle transmission 10 is formed by the transmission shown in FIG. 2. In it the clutch A is engaged whereas the clutch B is disengaged. The differential 15 allows the front and rear axles 3 and 6 to run at different speeds.

As will be seen from the above, the clutch B is only needed if charging is to take place while the vehicle is under way. In this case the IC engine 7 will be operating with all the clutches of the transmissions of FIGS. 2 and 3 engaged.

The diameters of intermediate gearing 19, 21 or 25 and 26, respectively of the transmissions of FIGS. 2 and 3 are not to scale. In the second form of the invention this intermediate gearing acts to allow for differences in speed of the electric motor and of the IC engine or its transmission output.

What is claimed is:

1. A hybrid vehicle comprising:
   first and second axles each with wheels thereon,
   an IC drive engine,
   an electric drive motor having a power output of the same order of magnitude of that of the engine,
   a first transmission means coupled to said first axle and to said drive engine for transmitting drive from the engine to the first axle,
   a second transmission means coupled to said second axle and to said drive motor for transmitting drive from the motor to the second axle,
   means including a universal joint shaft connected to said first and second transmission means for transmitting drive therebetween,
   a first differential connecting said universal joint shaft with one of said transmission means,
   said first and second transmission means including respective clutches for selectively connecting and disconnecting said drive engine and said drive motor to and from said first and second transmission means respectively, and respective clutch means for selectively connecting and disconnecting said universal joint shaft in driving relation to and from said first and second axles such that either the drive engine or the drive motor alone can selectively drive both of said axles concurrently.

2. The vehicle as claimed in claim 1 wherein at least one of said first and second transmission means comprises an input shaft connected via said respective clutch to said respective clutch means, and an intermediate gearing connected to said respective clutch means and to said associated axle.

3. The vehicle as claimed in claim 2 wherein said intermediate gearing includes a second differential.

4. A vehicle as claimed in claim 2 wherein said first differential connects said universal joint shaft to said input shaft via said respective clutch.

5. A vehicle as claimed in claim 1 wherein said second transmission means comprises an input shaft connected via said respective clutch and said respective clutch means to said universal joint shaft.

6. A vehicle as claimed in claim 1 wherein said second transmission means comprises an intermediate gearing between said second axle and said respective clutch means, said universal joint shaft being selectively connected to said second axle via said respective clutch means and said intermediate gearing.

7. A vehicle as claimed in claim 1 wherein said clutches and said clutch means of said first and second transmission means have individual operative and inoperative states such that in combination they provide selective states of operation so that in addition to permitting the drive engine or the drive motor alone to selectively drive both of said axles concurrently, the drive engine or drive motor alone can selectively drive either axle.

8. The vehicle as claimed in claim 1 wherein said electric motor is adapted for braking the vehicle by acting as a generator supplying current instead of being externally supplied with current said first and second transmission means being then operated so that the engine drives both axles and the motor is drivingly connected to one of said axles and is driven thereby as a generator.

9. The vehicle as claimed in claim 1 in the form of an articulated omnibus including a front carriage with at least two wheeled axles and a trailer segment articulated to the front carriage and with the IC engine in a rear portion thereof, said first axle being in said trailer segment and connected to said engine, said electric motor being placed in front of the rearmost of the two axles of the front carriage and under a floor thereof and connected with the latter axle by said second transmission.

10. The vehicle as claimed in claim 9 wherein said universal joint shaft connects aid second transmission in the front carriage to the first transmission in said trailer segment.

* * * * *